(12) United States Patent
Chepoori et al.

(10) Patent No.: US 12,493,472 B2
(45) Date of Patent: Dec. 9, 2025

(54) CONFIGURATION OF MANAGER-SUBORDINATE CONNECTIVITY PATHS OF A SYSTEM-ON-CHIP

(71) Applicant: Xilinx, Inc., San Jose, CA (US)

(72) Inventors: Vinaykumar Chepoori, Hyderabad (IN); Niloy Roy, Hyderabad (IN); Adithya Balaji Boda, Hyderabad (IN); Shashank Konanki, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/429,951

(22) Filed: Feb. 1, 2024

(65) Prior Publication Data
US 2025/0251944 A1  Aug. 7, 2025

(51) Int. Cl.
*G06F 9/4401* (2018.01)
(52) U.S. Cl.
CPC .................. *G06F 9/4411* (2013.01)
(58) Field of Classification Search
CPC ...................................................... G06F 9/4411
See application file for complete search history.

(56) References Cited

U.S. PATENT DOCUMENTS

| | | | | |
|---|---|---|---|---|
| 8,488,472 B2* | 7/2013 | Morris | ................... | H04L 41/082 370/242 |
| 9,779,037 B2* | 10/2017 | Wanner | ................... | G06F 9/4411 |
| 2006/0123154 A1* | 6/2006 | George | ............... | G06F 15/7825 710/33 |
| 2019/0379638 A1* | 12/2019 | Arnberg | .............. | H04L 63/0209 |
| 2020/0065290 A1* | 2/2020 | Natu | ................... | G06F 13/4221 |
| 2020/0342286 A1* | 10/2020 | Zhang | ................... | G06F 9/5066 |
| 2020/0401544 A1* | 12/2020 | Wang | ................... | G06F 13/4022 |
| 2021/0117578 A1* | 4/2021 | Cheruvu | .................. | G06F 21/85 |
| 2022/0253117 A1* | 8/2022 | Lee | ............................ | G05F 1/59 |
| 2024/0089180 A1* | 3/2024 | Singh | .................. | H04L 41/0859 |
| 2024/0205269 A1* | 6/2024 | Kumar | ................ | H04L 65/1069 |
| 2024/0241838 A1* | 7/2024 | Andrews | ................... | G06F 8/65 |

* cited by examiner

*Primary Examiner* — Steven G Snyder
*Assistant Examiner* — Aurangzeb Hassan
(74) *Attorney, Agent, or Firm* — Patterson + Sheridan, LLP

(57) ABSTRACT

A connectivity tool validates a connectivity configuration of each manager of a plurality of managers in a system-on-chip (SoC) architecture based on data that indicate excluded interfaces of a plurality of interfaces of the SoC architecture and excluded subordinates of a plurality of subordinates of the SoC architecture. The connectivity configuration specifies a connectivity status of the manager and one or more of the plurality of interfaces. The connectivity tool configures connectivity paths of the SoC to include a path from a manager of the plurality of managers to a subordinate of the plurality of subordinates for each valid connectivity configuration.

18 Claims, 9 Drawing Sheets

System Address Map 320 manager1: {address range, bit-width, callback N}
subordinate1: {address range, bit-width, callback N}
subordinate2: {address range, bit-width, callback N}
subordinate3: {address range, bit-width, callback N}
subordinate4: {address range, bit-width, callback N}
interface1: {address range, bit-width, callback N}
aperture1: {address range, bit-width, callback N}
aperture2: {address range, bit-width, callback N}

Architecture Specification 322 manager1: {subordinate1, subordinate2, interface1, callbacks N}

Designer Configuration 324 manager1_enable 1
subordinate1_enable 1
subordinate2_enable 1
interface1_enable 1

Metadata 326

"manager1" : {
 "property1" : "value1",
 "excluded_subordinates" : [ ]
 "excluded_interfaces" : [ ]

Connectivity Paths 328 manager1-subordinate1
manager1-subordinate2
manager1-interface1-aperture1-subordinate3
manager1-interface1-aperture2-subordinate4

FIG. 3B

System Address Map 420 manager1: {address range, 32-bit, callback N}
 subordinate1: {address range, bit-width, callback N}
 subordinate2: {address range, bit-width, callback N}
 subordinate3: {address range, bit-width, callback N}
 subordinate4: {address range, bit-width, callback N}
 interface1: {address range, bit-width, callback N}
 aperture1: {address range, 32-bit, callback N}
 aperture2: {address range, 64-bit, callback N}

Architecture Specification 422 manager1: {subordinate1,
 interface1, callbacks N}

Designer Configuration 424 manager1_enable 1
subordinate1_enable 1
subordinate2_enable 1
interface1_enable 1

Metadata 426

```
"manager1" : {
  "property1" : "value1",
  "EXCLUDED_subordinates" : ["subordinate2"]
  "EXCLUDED_interfaces" : [
    {
      "interface1" : {
        "APERTURE" : ["aperture2"]
      }
    }
  ]
}
```

Connectivity Paths 428 manager1-subordinate1
manager1-interface1-aperture1-subordinate3

FIG. 4B

System Address Map 520
manager1: {address range, 32-bit, callback N}
subordinate1: {address range, bit-width, callback N}
subordinate2: {address range, bit-width, callback N}
subordinate3: {address range, bit-width, callback N}
interface1: {address range, bit-width, callback N}
aperture1: {address range, 32-bit, callback N}
aperture2: {address range, 64-bit, callback N}
aperture3: {address range, 32-bit, callback Y]

Architecture Specification 522
manager1: {interface1}

Designer Configuration 524
manager1_enable 1
interface1_enable 1

Metadata 526
```
"manager1" : {
 "property1" : "value1",
 "EXCLUDED_subordinates" : []
 "EXCLUDED_interfaces" : [
  {
   "interface1" : {
    "APERTURE": [
     "aperture2",
     "aperture3:callback"]
   }
  }
 ]
}
```

Connectivity Paths 528
manager1-interface1-subordinate1
manager1-interface1-aperture3-subordinate3

FIG. 5B

CONFIGURATION OF MANAGER-SUBORDINATE CONNECTIVITY PATHS OF A SYSTEM-ON-CHIP

TECHNICAL FIELD

The disclosure generally relates to modeling connectivity paths in and SoC design.

BACKGROUND

Part of the process of making a system-on-chip (SoC) is specifying the connectivity paths between manager circuits ("managers" for brevity) and subordinate circuits ("subordinates" for brevity). Managers are generally recognized as components or "peripherals" that initiate transactions. Subordinates are peripherals that can be communicatively coupled to the managers to process the transactions. Examples of transactions include transactions for reading data and transactions for writing data at specified addresses within the address space of an SoC.

The specification of the connectivity paths is sometimes referred to as a "model," and the process of creating the specification is sometimes referred to as "modeling" the paths. The modeled connectivity paths are used in synthesis, placing, and routing the design of the SoC. Past approaches to modeling connectivity paths may be cumbersome and prone to errors when attempting to model the connectivity paths of current SoCs. SoC designs have grown to include many more managers and subordinates than past SoC designs, increasing the number of possible combinations and configuration alternatives. The large numbers of managers, subordinates, and configuration alternatives make current modeling processes infeasible for current and future SoC designs.

SUMMARY

A disclosed method includes validating, by a connectivity tool, a connectivity configuration of each manager of a plurality of managers in a system-on-chip (SoC) architecture based on data that indicate excluded interfaces of a plurality of interfaces of the SoC architecture and excluded subordinates of a plurality of subordinates of the SoC architecture. The connectivity configuration specifies a connectivity status of the manager and one or more of the plurality of interfaces. The method additionally includes configuring, by the connectivity tool, connectivity paths of the SoC to include a path from a manager of the plurality of managers to a subordinate of the plurality of subordinates for each valid connectivity configuration.

A disclosed system includes one or more computer processors and a memory arrangement coupled to the one or more computer processors. The one or more computer processors are configured to execute program code, and the memory arrangement is configured with instructions of a connectivity tool that when executed by the one or more computer processors cause the one or more computer processors to perform a number of operations. The operations include validating a connectivity configuration of each manager of a plurality of managers in a system-on-chip (SoC) architecture based on data that indicate excluded interfaces of a plurality of interfaces of the SoC architecture and excluded subordinates of a plurality of subordinates of the SoC architecture. The connectivity configuration specifies a connectivity status of the manager and one or more of the plurality of interfaces. The operations additionally include configuring connectivity paths of the SoC to include a path from a manager of the plurality of managers to a subordinate of the plurality of subordinates for each valid connectivity configuration.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which:

FIG. 3B shows examples of a system address map, an architecture specification, user configuration, metadata, and connectivity paths corresponding to the example of FIG. 3A;

FIG. 4B shows examples of a system address map, an architecture specification, user configuration, metadata, and connectivity paths corresponding to the example of FIG. 4A;

FIG. 5B shows examples of a system address map, an architecture specification, user configuration, metadata, and connectivity paths corresponding to the example of FIG. 5A.

DETAILED DESCRIPTION

Figure 1:
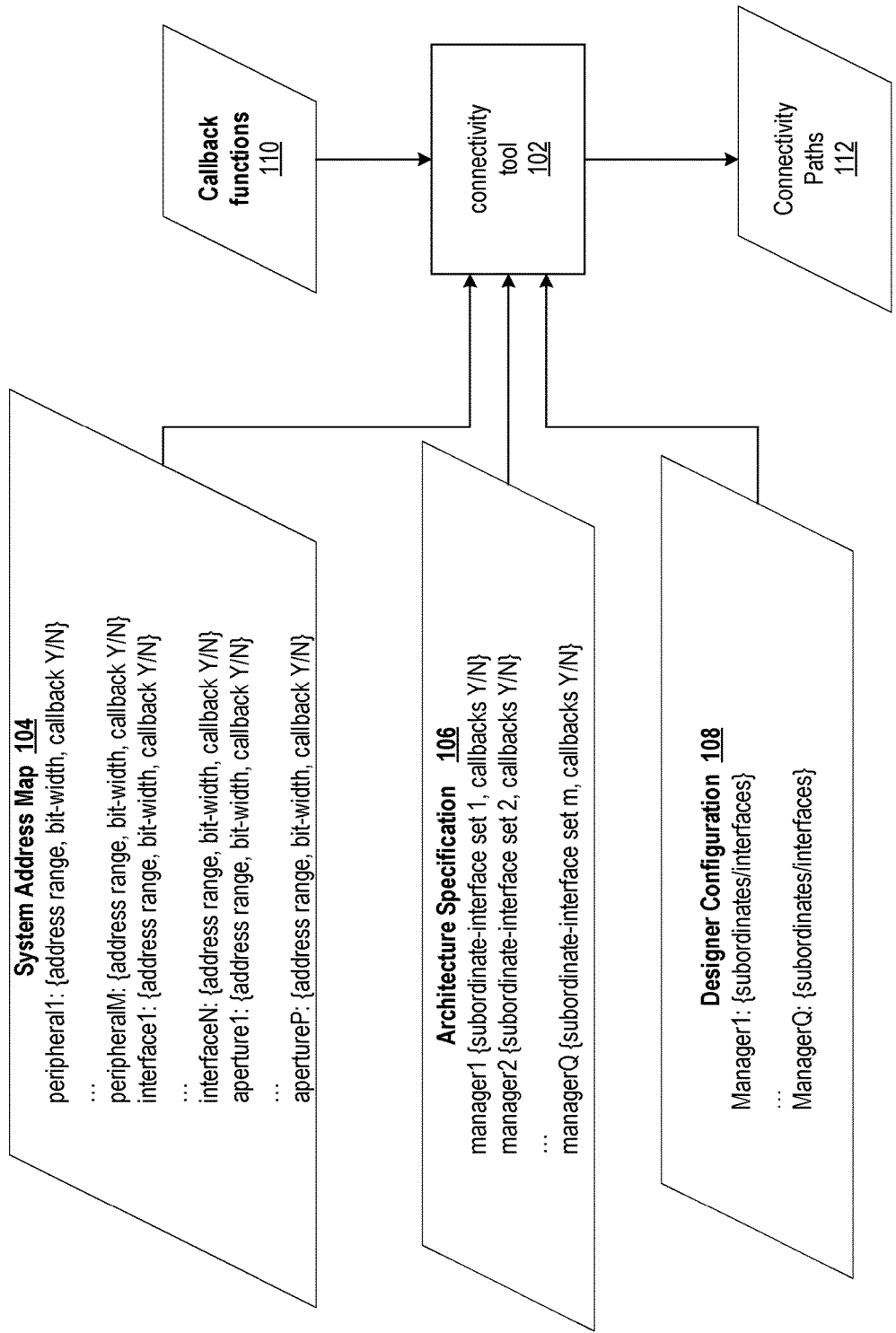
FIG. 1 shows a system for configuring connectivity paths of an SoC according to an example.

In the following description, numerous specific details are set forth to describe specific examples presented herein. It should be apparent, however, to one skilled in the art, that one or more other examples and/or variations of these examples, all of which are non-limiting, may be practiced without all the specific details given below. In other instances, well known features have not been described in detail so as not to obscure the description of the examples herein. For ease of illustration, the same reference numerals may be used in different diagrams to refer to the same elements or additional instances of the same element.

An SoC can have hundreds of managers and hundreds of subordinates, and subsystems of the SoC can add to the complexity of generating connectivity paths. A subsystem can include one or more managers and/or one or more subordinates. A manager within a subsystem may communicate with a subordinate that is external to the subsystem through an aperture of an interface. An interface can have one or more apertures, and each aperture can be communicatively coupled to one subordinate. Each aperture specifies a range of addresses, and only transactions referencing addresses within that range are allowed to pass through the aperture. Thus, the connectivity path from a manager internal to a subsystem to a subordinate external to the subsystem would identify the manager, the interface, the aperture, and the subordinate. The connectivity path between a manager and subordinate that are both internal to a subsystem would not involve an interface.

According to the disclosed methods and systems, a connectivity tool generates, for each manager in a system-on-chip (SoC) architecture, data that indicate excluded interfaces and subordinates in the SoC architecture. The connectivity tool determines which interfaces and subordinates are excluded based on data that indicate compatibility of managers with the interfaces and data that indicate accessibility of the subordinates to the managers through the interfaces. The connectivity tool validates a connectivity configuration of each manager based on the data that indicate excluded interfaces and subordinates. The connectivity configuration specifies a connectivity status of the manager and one or more of the interfaces. The connectivity tool configures connectivity paths of the SoC to include a path from a manager in the SoC to a subordinate in the SoC for each valid connectivity configuration.

FIG. 1 shows a system for configuring connectivity paths of an SoC according to an example. The system generally uses SoC specifications and configuration parameters provided by a designer to generate connectivity paths for the SoC. A connectivity tool 102 processes SoC specifications listed in a system address map 104 and architecture specification 106, along with designer configuration 108 to prepare the connectivity paths 112 for configuring the SoC.

The system address map 104 specifies properties, which can indicate compatibility, of the peripherals, interfaces, and apertures of the SoC. The properties include respective address ranges, bit-widths, etc. The architecture specification 106 specifies for each manager, the set of subordinates and interfaces accessible to the manager. Whether or not a manager is to be connected to a subordinate or interface can be specified in the designer configuration 108.

For connectivity paths the designer desires to be configured into the SoC, the designer can create a designer configuration 108, which specifies connectivity configurations for the desired manager-to-subordinate connectivity paths. According to an example, the designer configuration lists identifiers of managers of the desired connectivity paths. Associated with each of the manager identifiers is a list of identifiers of one or more subordinates and/or interfaces for one or more desired connectivity paths that begin at that manager. The connectivity tool 102 validates the connectivity configurations in the designer configuration 108 based on the compatibility determined from the system address map 104 and accessibility indicated by the architecture specification 106.

In generating the connectivity paths 112, the connectivity tool generates metadata according to a connectivity schema, and from the metadata the connectivity tool generates the connectivity paths. The schema generally includes three elements that are hierarchically organized by subsystem. The three elements include: managers, subordinates, and external addressing (interfaces).

The metadata of the managers element of a subsystem identifies the managers of the subsystem and lists the associated properties and parameters of the managers. The metadata of the subordinates element of a subsystem identifies the subordinates of the subsystem and lists the associated properties from which enablement can be determined. The metadata of the external addressing element of a subsystem identifies the interfaces of the subsystem, and for each interface lists the associated properties, parameters, and apertures from which enablement can be determined. Each identified interface can have a parameter that indicates whether the interface is enabled or disabled. A component that is enabled is eligible to be in a connectivity path, and a component that is disabled is not eligible to be in a connectivity path.

Different criteria can dictate whether or not different ones of the subordinates and interfaces are enabled. With the large number of managers and subordinates in new and future SoCs, specifying valid connectivity paths using static descriptions to specify connectivity paths involving subordinates having different enablement criteria would be complicated or even infeasible.

To handle determining enablement of the subordinates and interfaces, callback functions 110 can be specified to determine whether or not a subordinate or interface is to be enabled. Based on the designer configuration, callback functions can be executed by the connectivity tool to evaluate the enablement criteria and determine whether subordinates are enabled or disabled. The connectivity tool can reference callback functions in the metadata. Callback functions can also be used to derive various parameters such as frequency values, data modes, input/output types, etc., which depend on the designer configuration.

Examples of the enablement criteria for a peripheral can include a bus protocol implemented on the SoC (e.g., I2C or I3C) and whether or not the peripheral is configured as a boot peripheral. An example of enablement criteria for an interface is the combination of protocols specified in the designer configuration. For example an AXI interface will be enabled and an ACE-Lite interface will be disabled if the design configuration specifies enablement of the AXI interface and disablement of the ACE-Lite interface. Both the AXI interface and ACE-Lite interface can be enabled in response to the designer configuration specifying enablement of both interfaces.

A manager in a subsystem need not be connected to all subordinates in the subsystem, which the connectivity tool can determine based on the architecture specification 106. The connectivity tool specifies the manager-subordinate relationships by listing in the metadata associated with the manager, identifiers of subordinates that are excluded. By default, all the subordinates in a subsystem can be in a connectivity path with a manager in the subsystem. Those subordinates identified in a list of excluded subordinates list cannot be connected to the associated manager.

Not all interfaces of a subsystem are necessarily reachable by a manager in that subsystem, which the connectivity tool can determine from the system address map 104 and architecture specification 106. The connectivity tool specifies manager-interface relationships in the metadata by listing excluded interfaces in association with each manager. All the interfaces of a subsystem are accessible to a master in that subsystem except those interfaces identified in the list of excluded interfaces.

As indicated above, a manager in a subsystem can be communicatively coupled to subordinate external to the subsystem through an aperture of an interface, and an interface can have multiple apertures. According to the disclosed approaches, one or more apertures of an interface can be excluded from connectivity to a manager, and one or more other apertures of that interface can remain eligible for connectivity to that manager. The connectivity tool specifies excluded apertures in the metadata associated with a manager by listing identifiers of excluded apertures in association with an interface identifier. Apertures of the interface not listed as excluded can be connected to the master.

Figure 2:
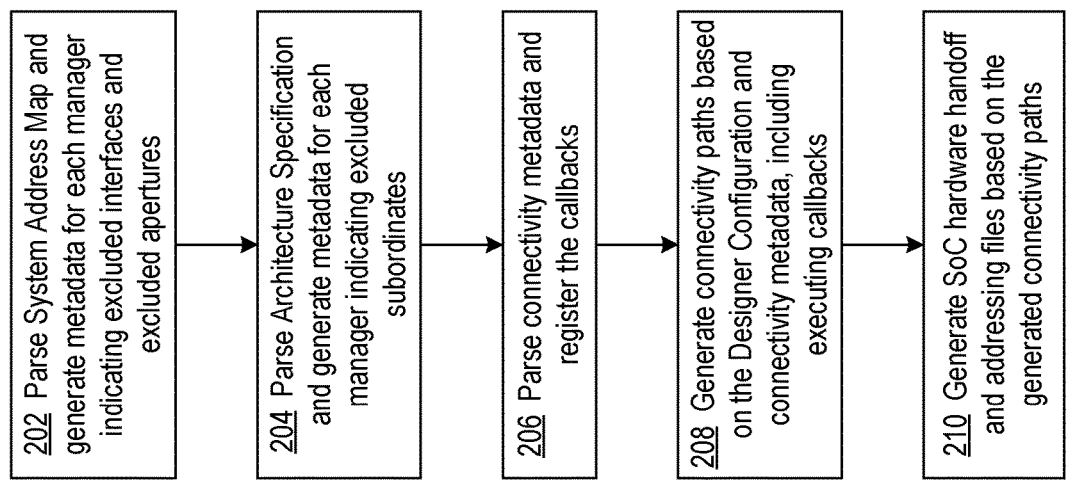
FIG. 2 shows a flowchart of an exemplary process of configuring master-subordinate connectivity paths of an SoC.

FIG. 2 shows a flowchart of an exemplary process of configuring master-subordinate connectivity paths of an SoC. At block 202, the connectivity tool parses the system address map 104 (FIG. 1) and generates metadata for each manager. The metadata indicate for each manager, which interfaces and apertures are excluded. The metadata also indicate any callback functions associated with the interfaces and/or apertures. Excluded interfaces and apertures can be determined from the address ranges associated with the managers, interfaces, and apertures. In addition, excluded apertures can be determined from the bit-widths of the managers and apertures. Callback functions listed in the metadata are extracted from the properties in the system address map.

At block 204, the connectivity tool parses the architecture specification 106 (FIG. 1) and generates for each manager, metadata that indicate which subordinates are excluded. Subordinates of a subsystem that are not listed in association with a manager of the subsystem in the architecture specification are listed as excluded subordinates. The metadata also indicate any callback functions associated with the subordinates in the architecture specification.

At block 206, the connectivity tool parses the connectivity metadata and registers callback functions for execution.

At block 208, the connectivity tool generates the connectivity paths using the metadata and executing any callback functions referenced in the metadata. As an example, the designer configuration may specify that a particular subordinate in a subsystem is disabled, and the architecture specification may indicate that a manager in the subsystem has access to the subordinate. A callback function can indicate that a connectivity path from the manager to the subordinate should not be generated based on the property specified for the subordinate in the designer configuration.

At block 210, the SoC configuration tools can be used to generate hardware handoff and addressing files based on the generated connectivity paths. The hardware handoff and addressing files can be used to make and/or configure the SoC by processes such place-and-route, bitstream generation, and/or device fabrication.

Figure 3A:
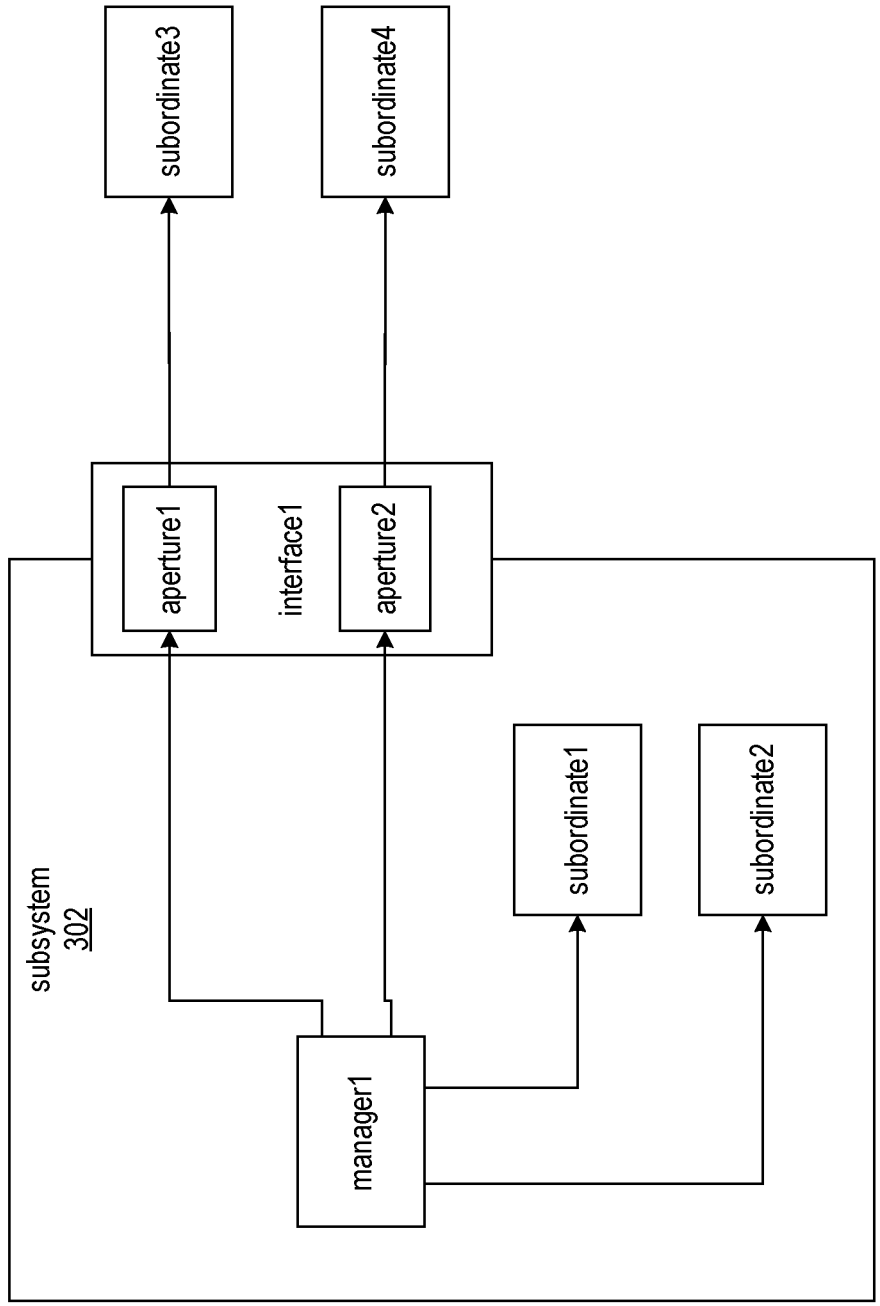
FIG. 3A illustrates exemplary connectivity paths between a manager inside a subsystem of an SoC and subordinates inside and outside of the subsystem.

FIG. 3A illustrates exemplary connectivity paths between a manager inside a subsystem 302 of an SoC and subordinates inside and outside of the subsystem. Subsystem 302 includes manager1, subordinate1, subordinate2, and interface1. Interface1 includes aperture1 and aperture2, which are coupled to subordinate3 and subordinate4, respectively. Subordinate3 and subordinate4 are outside of subsystem 302. Connectivity paths couple manager1 to subordinate1, subordinate2, subordinate3 (through apertuer1 of interface1), and subordinate4 (through apertuere2 of interface1). By default, manager1 can access all the internal subordinates (subordinate1 and subordinate2) and all the interfaces (interface1) of the subsystem.

FIG. 3B shows examples of a system address map, an architecture specification, user configuration, metadata, and connectivity paths corresponding to the example of FIG. 3A. System address map 320 lists the components shown in FIG. 3A, along with associated sets of properties. Architecture specification 322 specifies the set of components in subsystem 302 that are accessible to manager1.

Designer configuration 324 specifies the desired connectivity status (enabled or disabled) of components in subsystem 302 for connectivity paths involving manager1. According to an example, each component is specified with an associated enablement flag having a value of "1" or "0," which indicates enabled or disabled, respectively. For example, "subordinate1_enable 1" indicates that subodinate1 can be in a connectivity path from manager1.

Metadata 326 generated by connectivity tool 102 (FIG. 1) specifies the properties of manager1 (e.g., "property1": "value1"). The lists of excluded subordinates and excluded interfaces are empty, because there are not disabled subordinates or interfaces and architecture specification 322 indicates that the components are accessible and system address map 320 does not indicate an incompatibility.

Connectivity tool 102 generates connectivity paths 328 based on metadata 326, system address map 320, architecture specification 322, and designer configuration 324. The connectivity paths include paths from manager1 to each of subordinate1, subordinate2, subordinate3, and subordinate4. Each connectivity path identifies all the components between manager1 and the destination subordinate. For example, the connectivity path from manager1 to subordinate4 is "manager1-interface1-aperture2-subordinate4."

Figure 4A:
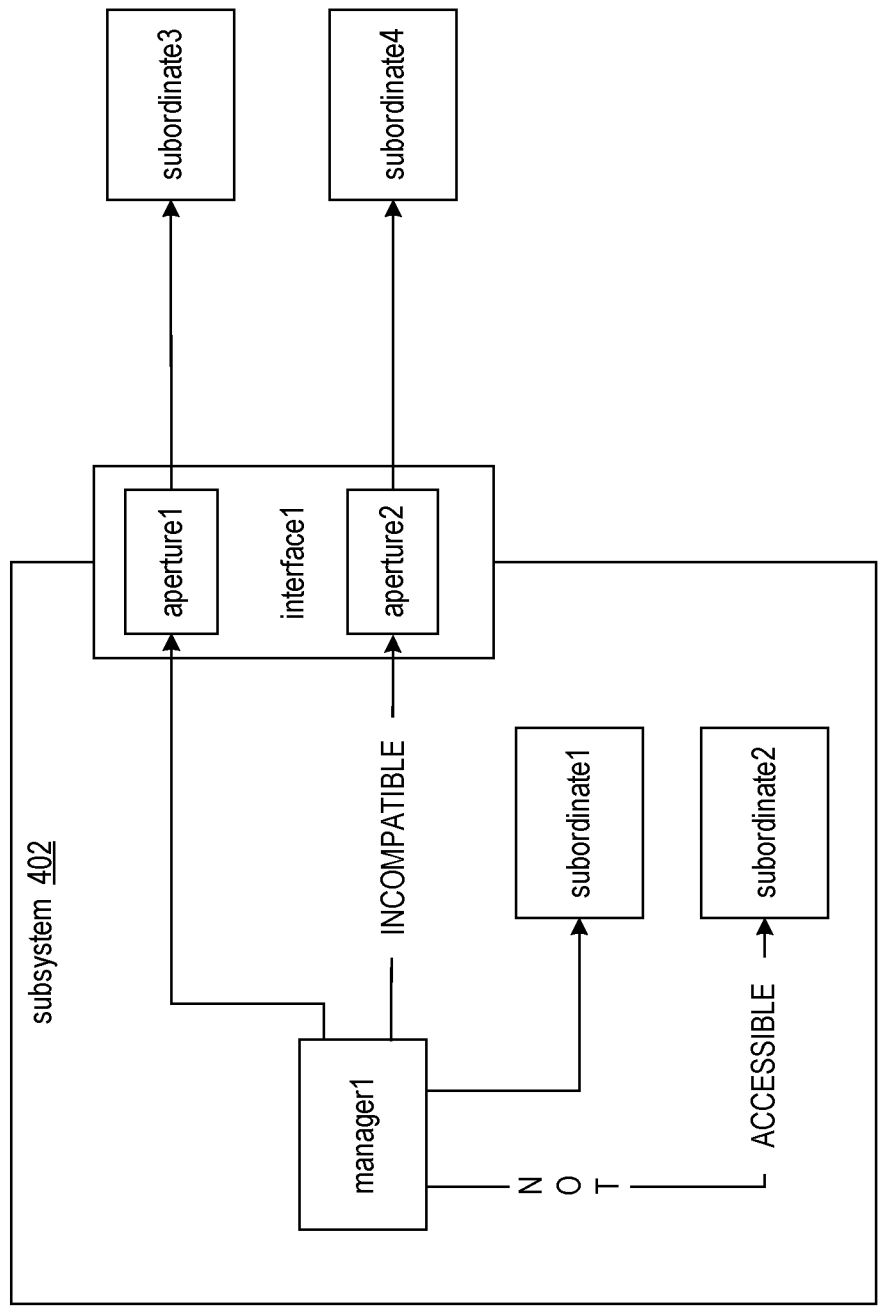
FIG. 4A illustrates exemplary valid and invalid connectivity paths between a manager and subordinates inside and outside of a subsystem.

FIG. 4A illustrates exemplary valid and invalid connectivity paths between a manager and subordinates inside and outside of subsystem 402. Subsystem 402 includes manager1, subordinate1, subordinate2, and interface1. Interface1 includes aperture1 and aperture2, which are coupled to subordinate3 and subordinate4, respectively. Subordinate3 and subordinate4 are outside of subsystem 402. Connectivity paths couple manager1 to subordinate1 and subordinate3 (through aperture1 of interface1).

As an example, manager1 is a processor of bit-width 32 and can access only subordinates of bit-width 32. Aperture1 of interface1 has a bit-width of 32, but aperture2 has a bit-width of 64. Manager1 is incompatible with aperture2 and a connectivity path having a manager1-aperture2 connection would not be generated. Continuing with the example, subordinate1 may be accessible to manager1 and subordinate2 may be inaccessible to manager1 based on the architecture specification. The valid connectivity paths are manager1-subordinate1 and manager1-interface1-aperture1-subordinate1.

FIG. 4B shows examples of a system address map, an architecture specification, user configuration, metadata, and connectivity paths corresponding to the example of FIG. 4A. System address map 420 lists the components shown in FIG. 4A, along with associated sets of properties. Architecture specification 422 specifies the set of components in subsystem 402 that are accessible to manager1. Designer configuration 424 specifies the desired connectivity status (enabled or disabled) of components in subsystem 402 for connectivity paths involving manager1.

System address map 420 shows bit-widths of manager1 and aperture2 to be 32-bit and 64-bit, respectively. Based on the incompatible bit-widths, the connectivity tool lists aperture2 under the excluded interfaces in metadata 426. Subordinate2 is not listed as a component accessible to manager2 in architecture specification 422. Based on the architecture specification, the connectivity tool lists subordinate2 in the list of excluded interfaces in the metadata.

Connectivity tool 102 generates connectivity paths 428 based on metadata 426, system address map 420, architecture specification 422, and designer configuration 424. The connectivity paths include paths from manager1 to each of subordinate1 and subordinate3.

Figure 5A:
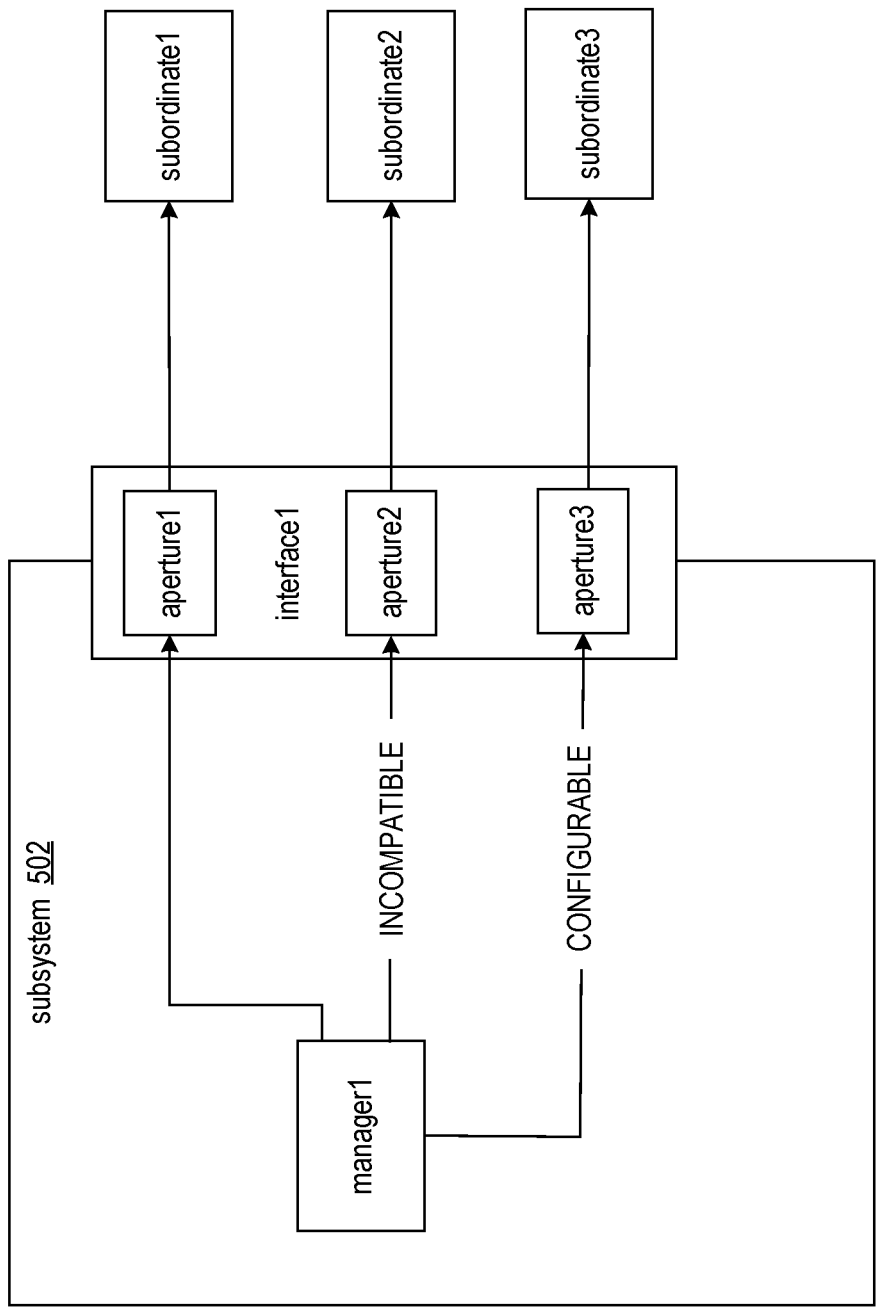
FIG. 5A illustrates an example having valid and invalid connectivity paths between a manager inside and subordinates outside of a subsystem, in an example involving a callback function that determines validity of a path.

FIG. 5A illustrates an example having valid and invalid connectivity paths between a manager inside and subordinates outside of a subsystem 502, in an example involving a callback function that determines validity of a path. Subsystem 502 includes manager1 and interface1, and interface1 includes aperture1, aperture2, and aperture3, which are coupled to subordinate1, subordinate2, and subordinate3, respectively. As in the example of FIGS. 4A and 4B, manager1 is incompatible with aperture2, because the manager1 and aperture2 have different bit-widths.

The connection from manager1 to aperture3 is configurable in that the validity is determined by a callback function executed by the connectivity tool. The callback function can be associated with aperture3 and detected by the connectivity tool in parsing the architecture specification.

FIG. 5B shows examples of a system address map, an architecture specification, user configuration, metadata, and connectivity paths corresponding to the example of FIG. 5A. System address map 520 lists the components shown in FIG. 5A, along with associated sets of properties. Architecture specification 522 specifies the set of components in subsystem 502 that are accessible to manager1. Designer configuration 524 specifies the desired connectivity status (enabled or disabled) of components in subsystem 502 for connectivity paths involving manager1.

System address map 520 shows bit-widths of manager1 and aperture2 to be 32-bit and 64-bit, respectively. Based on the incompatible bit-widths, the connectivity tool lists aperture2 under the excluded interfaces in metadata 526. Interface1 is listed with a callback function in system address map 520. Based on the system address map, the connectivity tool lists the callback function in association with aperture3 in the list of excluded interfaces in the metadata.

Connectivity tool 102 generates connectivity paths 528 based on metadata 526, system address map 520, architecture specification 522, and designer configuration 524. The connectivity paths include a path from manager1 to subordinate1. Whether or not the path from manager1 to subordinate3 (manager1-interface1-aperture3-subordinate3) is generated by the connectivity tool would depend on the validity indication returned by the callback function.

Figure 6:
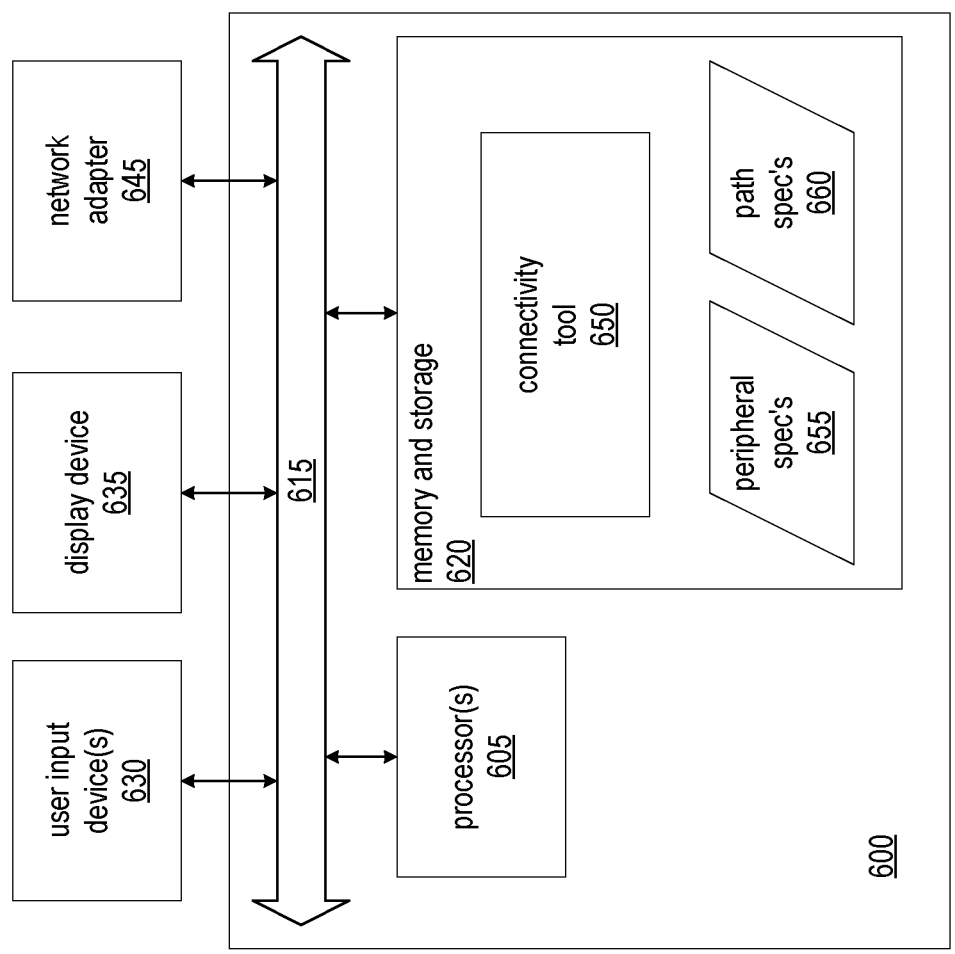
FIG. 6 is a block diagram illustrating an exemplary data processing system.

FIG. 6 is a block diagram illustrating an exemplary data processing system (system) 600. System 600 is an example of an electronic design automation (EDA) system. As pictured, system 600 includes at least one processor circuit (or "processor"), e.g., a central processing unit (CPU) 605 coupled to memory and storage arrangement 620 through a system bus 615 or other suitable circuitry. System 600 stores program code and peripheral specifications 655 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application, which includes connectivity tool 650. The EDA application, being implemented in the form of executable program code, is executed by processor(s) 605. As such, the EDA application and connectivity tool 650 are considered part of system 600. System 600, which is configured as EDA tool while executing the EDA application and connectivity tool 650, receives and operates on peripheral specifications 655. In one aspect, system 600 generates path specifications 660 which can be used in configuring or making and SoC.

Connectivity tool 650, peripheral specifications 655, and path specifications 660, and any data items used, generated, and/or operated upon by system 600 are functional data structures that impart functionality when employed as part of system 600 or when such elements, including derivations and/or modifications thereof, are loaded into an IC such as a programmable IC causing implementation and/or configuration of a circuit design within the programmable IC.

Various logic may be implemented as circuitry to carry out one or more of the operations and activities described herein and/or shown in the figures. In these contexts, a circuit or circuitry may be referred to using terms such as "logic," "module," "engine," "generator," or "block." It should be understood that elements labeled by these terms are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for configuring connectivity paths between managers and subordinates in and SoC. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:
1. A method, comprising:
   modeling, by a connectivity tool, connectivity paths of a circuit design that comprises manager circuits configured to initiate input/output (IO) transactions, subordinate circuits configured to process the IO transactions, and interfaces configured to interface amongst the manager circuits and the subordinate circuits, wherein the method comprises:
   extracting data and a callback function from one or more data sources, wherein the data is indicative of one or more of accessibility and compatibility of the subordinate circuits and the interfaces with respect to the manager circuits, and wherein the callback function is configured to determine validity of circuit design paths;

generating data based on the extracted data, wherein the generated data includes identifications of excluded ones of the subordinate circuits and excluded ones of the interfaces, for each of the manager circuits, based on the extracted data;

validating connectivity configurations of the manager circuits based on the excluded interfaces, the excluded subordinates circuits, and the callback function, wherein the connectivity configurations specify connectivity statuses of the manager circuits and one or more of the interfaces; and configuring connectivity paths of the circuit design to include a path from one of the manager circuits to one of the subordinate circuits for each valid connectivity configuration.

2. The method of claim 1, wherein the validating comprises executing the callback function to determine validity of a path from one of the manager circuits to one of the subordinate circuits based on the data that is indicative of the accessibility of the subordinate circuit to the manager circuit.

3. The method of claim 1, wherein the validating comprises executing the callback function to determine validity of path from a one of the manager circuits to one of the subordinate circuits based on the data that is indicative of the compatibility of the manager circuit with the interfaces.

4. The method of claim 3, wherein the generating comprises specifying a reference to the callback function in association with one or more of the excluded interfaces.

5. The method of claim 3, wherein the generating comprises specifying a reference to the callback function in association with one of the excluded subordinate circuits.

6. The method of claim 1, wherein the generating comprises generating data that indicate excluded apertures of the interfaces based on data that indicate compatibility of the manager circuits with the apertures.

7. The method of claim 1, wherein configuring the connectivity paths includes configuring a connectivity path from one of the manager circuits to a first subordinate circuits of the subordinate circuits in response to a corresponding one of the connectivity configurations specifying the first subordinate circuit is enabled.

8. The method of claim 1, wherein configuring the connectivity paths includes configuring a connectivity path from one of the manager circuits to a first subordinate circuits of the subordinate circuits in response to a corresponding one of the connectivity configurations specifying the manager circuit is enabled and the first subordinate circuit is enabled.

9. The method of claim 1, wherein the validating the connectivity configurations includes evaluating compatibility of a bit-width of one of the manager circuits with a bit-width of one of the subordinate circuits in the data that indicate the compatibility.

10. A system comprising:
a processor and memory encoded with instructions to cause the processor to model connectivity paths of a circuit design that comprises manager circuits configured to initiate input/output (IO) transactions, subordinate circuits configured to process the IO transactions, and interfaces configured to interface amongst the manager circuits and the subordinate circuits, including to:

extract data and a callback function from one or more data sources, wherein the data is indicative of one or more of accessibility and compatibility of the subordinate circuits and the interfaces with respect to the manager circuits, and wherein the callback function is configured to determine validity of circuit design paths;

generate data based on the extracted data, wherein the generated data includes identifications of excluded ones of the subordinate circuits and excluded ones of the interfaces, for each of the manager circuits, based on the extracted data;

validate connectivity configurations of the manager circuits based on the excluded interfaces, the excluded subordinates circuits, and the callback function, wherein the connectivity configurations specify connectivity statuses of the manager circuits and one or more of the interfaces; and configure connectivity paths of the circuit design to include path from one of the manager circuits to one of the subordinate circuits for each valid connectivity configuration.

11. The system of claim 10, wherein the instructions further cause the processor to execute the callback function to determine validity of path from one of the manager circuits to one of the subordinate circuits based on the data that is indicative of the accessibility of the subordinates circuits to the manager circuits.

12. The system of claim 10, wherein the instructions further cause the processor to execute the callback function to determine validity of path from one of the manager circuits to one of the subordinate circuits based on the data that is indicative of the compatibility of the manager circuits with the interfaces.

13. The system of claim 12, wherein the instructions further cause the processor to specify a reference to the callback function in association with one or more of the excluded interfaces.

14. The system of claim 12, wherein the instructions further cause the processor to specify a reference to the callback function in association with one or more of the excluded subordinate circuits.

15. The system of claim 10, wherein the instructions further cause the processor to generate data that indicates excluded apertures of one or more of the interfaces based on data that indicate compatibility of the manager circuits with the apertures.

16. The system of claim 10, wherein the instructions further cause the processor to configure a connectivity path from one of the manager circuits to a first subordinate circuit of the subordinate circuits in response to a corresponding one of the connectivity configurations specifying the first subordinate circuit is enabled.

17. The system of claim 10, wherein the instructions further cause the processor to configure a connectivity path from a first manager circuit of the manager circuits to a first subordinate circuit of the subordinate circuits in response to a corresponding one of the connectivity configurations specifying the first manager circuit is enabled and the first subordinate circuit is enabled.

18. The system of claim 10, wherein the instructions further cause the processor to evaluate compatibility of a bit-width of one of the manager circuits with a bit-width of one of the subordinate circuits in the data that indicate the compatibility.

\* \* \* \* \*